United States Patent

Johnston et al.

[11] Patent Number: 5,848,678
[45] Date of Patent: Dec. 15, 1998

[54] PASSIVE MAGNETORHEOLOGICAL CLUTCH

[75] Inventors: Gary Lee Johnston, Pleasant Hill; William Charles Kruckemeyer, Beavercreek; Richard Edward Longhouse, Dayton, all of Ohio

[73] Assignee: General Motors Corporation, Detroit, Mich.

[21] Appl. No.: 869,299

[22] Filed: Jun. 4, 1997

[51] Int. Cl.[6] .................................................... F16D 37/00
[52] U.S. Cl. ...................... 192/21.5; 192/82 T; 192/84.3; 188/267.2
[58] Field of Search ............................... 192/58.43, 82 T, 192/84.3, 21.5; 188/267.2, 268; 123/41.49

[56] References Cited

U.S. PATENT DOCUMENTS

| | | | |
|---|---|---|---|
| 2,543,394 | 2/1951 | Winther | 192/21.5 |
| 2,736,409 | 2/1956 | Logan | 192/21.5 |
| 2,804,955 | 9/1957 | Gill | 192/21.5 |
| 2,813,605 | 11/1957 | Buslik et al. | 192/21.5 |
| 3,394,784 | 7/1968 | Searle | 192/21.5 |
| 4,227,861 | 10/1980 | LaFlame | 416/169 A |
| 4,285,421 | 8/1981 | Halsted | 192/84 C |
| 4,302,156 | 11/1981 | LaFlame | 416/169 A |
| 4,310,085 | 1/1982 | LaFlame | 192/58 B |
| 4,664,236 | 5/1987 | Stangroom | 192/35 |
| 4,896,754 | 1/1990 | Carlson et al. | 192/21.5 |
| 4,920,929 | 5/1990 | Bishop | 123/41.49 |
| 4,957,644 | 9/1990 | Price et al. | 252/62.52 |
| 4,967,887 | 11/1990 | Annacchino et al. | 192/21.5 |
| 5,007,303 | 4/1991 | Okuzumi | 74/573 F |
| 5,007,513 | 4/1991 | Carlson | 192/21.5 |
| 5,054,593 | 10/1991 | Carlson | 192/21.5 |
| 5,090,531 | 2/1992 | Carlson | 192/21.5 |
| 5,137,128 | 8/1992 | Takei et al. | 192/21.5 |
| 5,524,743 | 6/1996 | Bullough et al. | 192/21.5 |
| 5,598,908 | 2/1997 | York et al. | 192/21.5 |
| 5,713,444 | 2/1998 | Schroeder | 192/21.5 |

OTHER PUBLICATIONS

Grau R. et al—The Magnetic Particle Clutch (A Versatile Control Element for Rocket Systems), Aerospace Engineering 1961.
Varadakumari, G. et al—Viscous torque of disc–type magnetic fluid slip clutches, IEE Proc., 1984.
Magnetic Particle Clutch, Automobile Engineer, May 1954 pp. 181–186.
Rabinow, J. —The Magnetic Fluid Clutch, AIEE Transactions, vol. 67, 1948.
Rabinow, J. —Magnetic–Fluid Control Devices, presented at the SAE National Transportation Meeting, Cleveland, 1949.
Ramakrishnan, S. et al—Theory and performance of the disc–type electromagnetic particle clutch under continuous slip service, IEE Proc., 1980.

*Primary Examiner*—Charles A. Marmor
*Assistant Examiner*—Saúl J. Rodriguez
*Attorney, Agent, or Firm*—Jeffrey A. Sedlar

[57] ABSTRACT

A passive magnetorheological clutch includes an input member that is constantly driven at engine speed, or some selected proportion thereof. An output member is journaled on the input member so as to be supported thereon in a nonrotating state and to be concentrically rotatable in concert therewith. A space presented between the input and output members contains a quantity of magnetorheological fluid. The space also contains an engagement mechanism including a permanent magnet and a ferromagnetic ring concentrically positioned with an operative gap therebetween, wherein the operative gap's dimension is variable to effect changes in the magnetic field passing between the magnet and the ring. When an actuator effects a reduction in the distance between the magnet and ring, the amount of magnetic field increases in density adjacent the ring. The resultant torque transfer from the input member to the output member is effected across the operative gap and through the magnetorheological fluid. As the operative gap is reduced, the torque transfer increases in a gradual and progressive manner.

6 Claims, 1 Drawing Sheet

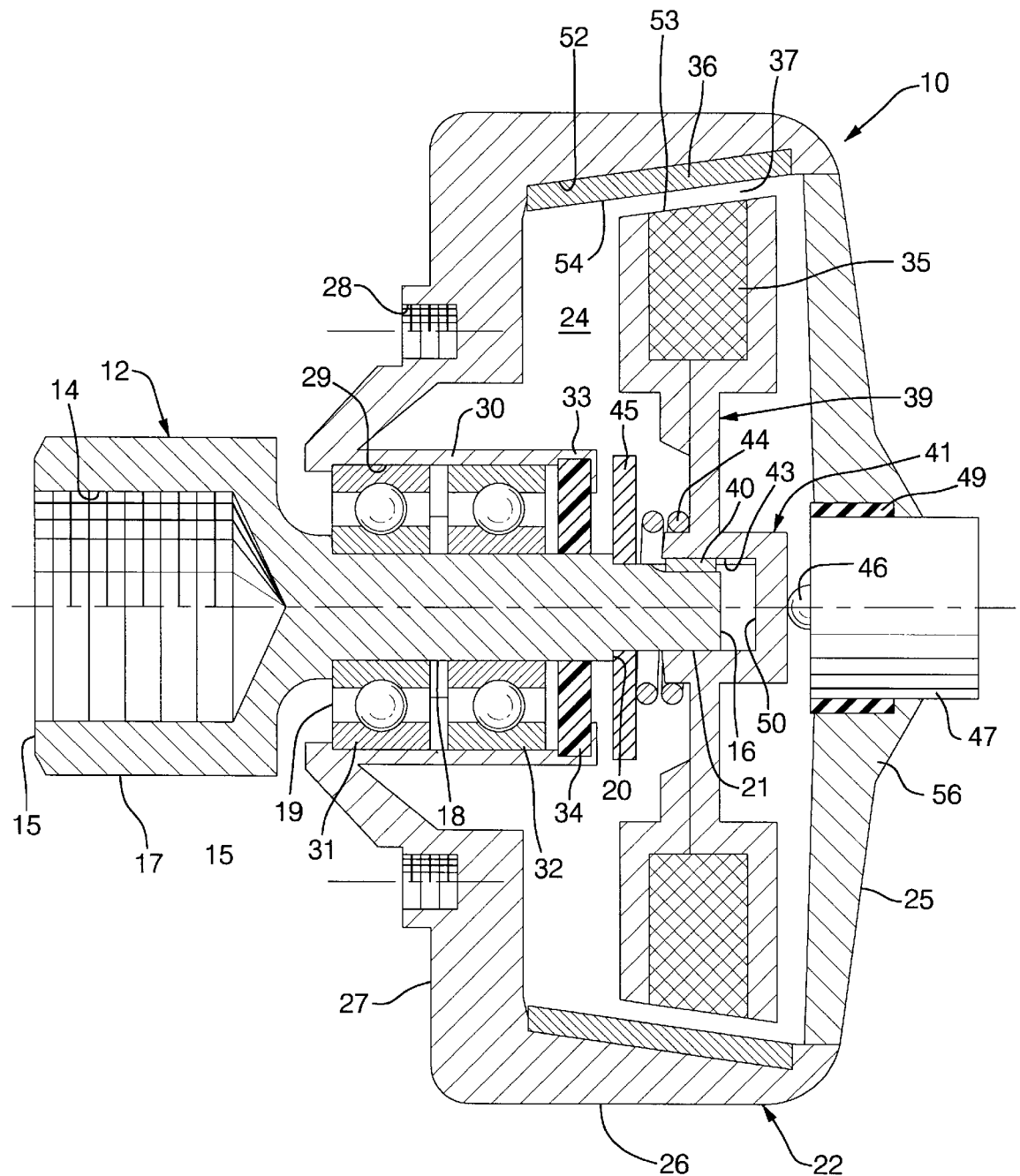

PASSIVE MAGNETORHEOLOGICAL CLUTCH

TECHNICAL FIELD

The present invention relates to a passive magnetorheological clutch. More particularly, the invention relates to an engine driven cooling fan clutch utilizing a magnetorheological suspension fluid subjected to an electromagnetic field that is variable without an external electrical source.

BACKGROUND OF THE INVENTION

Fluids are known wherein material such as finely powdered iron or iron alloy particles are carried in a liquid such as mineral oil or silicone. The suspension of ferromagnetic particles in a fluid medium is known to affect the rheology of the fluid, particularly when subjected to magnetic flux. More specifically, flow characteristics can change by several orders of magnitude within milliseconds when subjected to a suitable magnetic field. The ferromagnetic particles remain suspended under the influence of magnetic fields and applied forces. Such magnetorheological fluids have been found to have desirable electro-magnetomechanical interactive properties for advantageous use in variable power transmission devices such as clutches, where magnetic fields provide the essential coupling in the energy transfer process. For example, magnetorheological fluids exhibit a self reversing increase in viscosity when subjected to an increase in an externally supplied magnetic field. The common magnetic field is distributed throughout a region of space, generally in a variable manner depending on distance from the field's source with the flux density being high close to the surface of the source. The fluid's rheology varies depending on the magnetic flux density and the location in the magnetic field.

Conventionally, motor vehicles with internal combustion engines employ a fan to move cooling air through a radiator to reduce the temperature of coolant fluid circulated therein. For improved efficiency, a clutch is generally included that engages when the engine coolant is above a certain preselected temperature, and disengages when the coolant is below that temperature. Often, the clutch utilizes the viscous properties of a contained fluid to provide a gradual and progressive angular fan acceleration. A typical clutch design utilizes fluid that is carried in a reservoir and is introduced to a working chamber engaging the clutch and rotating the attached fan.

Coupled devices, including clutches for use in environments such as cooling systems, that operate with electromagnetomechanical engagement mechanisms are known, wherein rotation of an output member relative to a driven input member is controlled by means of magnetic flux. The magnetic flux lines pass through the input and output members along with air or fluid gaps to transfer torque. At the art's infancy, fluids were developed that freed the input and output members from one another permitting relative and independent rotation therebetween when the magnetic field was absent. When the necessary electromagnetic coil was energized, the magnetic fluid locked the input and output members together for unitary rotation. Generally, this meant that the fan was nearly instantaneously accelerated to engine speed, which results in the impartation of high stresses and tends to generate undesirable noise levels.

One known method of overcoming these drawbacks is to include both an electromagnetic engagement mechanism and a viscous fluid engagement mechanism in series within the fan clutch. The electromagnetic mechanism is positioned so that upon engagement, an intermediate member is driven, substantially instantaneously. The intermediate member is coupled to the output member through the viscous fluid engagement mechanism providing slippage so that the fan is accelerated gradually. However, this leads to a complicated, large and rather costly assembly. Additionally, the use of an electromagnet requires coordination with an electric/electronic control apparatus which can be a drawback.

SUMMARY OF THE INVENTION

The present invention provides a passive magnetorheological clutch, particularly useful in driving a vehicle cooling fan, and in accelerating the same in a gradual and progressive manner without the need for external electric/electronic controls. According to this preferred operational manner, the clutch is passive in-that, the engagement mechanism is driven, rather directly, in response to an increase in coolant temperature. Output torque is effected by varying the exchange of a flux field in the magnetorheological fluid through movement of a permanent magnet. Position variance is effected by a force generating temperature sensitive actuator, providing desired modulation rates in a straightforward manner.

More specifically, a passive magnetorheological clutch in accordance with the present invention preferably includes an input member that is constantly driven at engine speed, or at some selected proportion thereof. An output member is journaled on the input member so as to be supported thereon in a nonrotating state and alternately, to be concentrically rotatable in concert therewith. A space presented between the input and output members contains a quantity of magnetorheological fluid. The space also contains an engagement mechanism including a permanent magnet and a ferromagnetic element, positioned with a region hereinafter referred to as the "operative gap," therebetween. The operative gap's critical dimension (which is the distance between the permanent magnet and the ferromagnetic element), is variable to effect changes in the magnetic field passing between the magnet and the element. A conventional type actuator employing a material such as a contained gas, polymer, slurry or similar composition that expands with rising temperature provides the motive force to vary the relative position between the magnet and element.

When the actuator effects a reduction in the distance between the magnet and the ferromagnetic element, the magnitude of magnetic field increases in density adjacent the element. The resultant torque transfer from the input member to the output member is effected across the operative gap and through the magnetorheological fluid. As the operative gap is reduced, the torque transfer increases in a gradual and progressive manner.

According to a preferred embodiment of the present invention described in greater detail herein, the permanent magnet is carried by a rotor that is keyed to rotate in concert with the input member. The ferromagnetic element is configured as a ring positioned concentrically with the magnet, radially outside thereof, and is fixed in the output member. The ring is preferably frusto-conical in shape, so that when the magnet is moved longitudinally, the operative gap is reduced, increasing the flux density therethrough. A positive stop is provided to maintain a minimal operative gap, ensuring release to a disengaged state.

BRIEF DESCRIPTION OF THE DRAWINGS

The present invention will now be described, by way of example, with reference to the accompanying drawing, in which:

The FIGURE is a schematic cross-sectional representation of a passive magnetorheological clutch according to the present invention.

DETAILED DESCRIPTION OF THE PRESENTLY PREFERRED EMBODIMENT

Referring to the drawing, a passive magnetorheological fan clutch is illustrated as the exemplary embodiment and is designated generally as 10. Fan clutch 10 includes an input member 12 that is provided with a common means of attachment through threaded opening 14. The input member 12 is adapted to be connected to a vehicle's internal combustion engine (not illustrated), through the opening 14, in a well known manner for rotation at engine speed or some selected proportion thereof. In particular, input member 12 comprises an axial shaft having a first connecting end 15 and a second terminal end 16. The threaded opening 14 is presented at the first end 15 and is formed in enlarged segment 17. Adjacent enlarged segment 17, the input member tapers down and includes an intermediate segment 18 formed between annular shoulders 19 and 20. Additionally, a reduced diameter segment 21 is formed between annular shoulder 20 and terminal end 16.

An output member 22 comprises a multi-pieced shell-like structure substantially enclosing an internal cavity 24 about the input member 12. The output member 22 is substantially cylindrical in shape and includes a forward wall 25, annular side wall 26 and rearward wall 27. The rearward wall 27 includes a plurality of threaded openings 28 for securing a conventional engine cooling fan (not illustrated), thereto. The rearward wall 27 also presents a circular opening 29 formed within inwardly directed cylindrical wall 30. The cylindrical wall 30 provides a surface upon which the output member 22 is journaled on the intermediate section 18 of input member 12 by a pair of ball bearing assemblies 31 and 32, which are commonly known in the art. Each of the ball bearing assemblies 31 and 32 includes an inner race that is pressed onto the intermediate section 18 of input member 12 and an outer race that is contained within the cylindrical wall 30 of the output member 22. The respective inner and outer races each contain a plurality of balls contained within a cage, and the ball bearing assemblies 31 and 32 comprise generally annular constructions. An elastomeric seal 34 is carried between the inner terminal end 33 of cylindrical wall 30 and the intermediate section 18 of input member 12 sealingly bearing thereagainst to securely close the cavity 24.

The output member 22 is carried on the input member 12 such that the input member 12 is rotatable while the output member 22 remains substantially disengaged therefrom, journaled thereon in a substantially nonrotatable fashion. Accordingly, the engine cooling fan connected to the output member 22, will generally not be driven to induce cooling air flow absent some means of engagement between the output member 22 and the input member 12. In order to provide this means of engagement, the fan clutch 10 includes a variable engagement mechanism utilizing the magnetorheological properties of a fluid carried within the cavity 24.

Magnetorheological fluids comprising a suspension of solid particles in a selected liquid are known wherein the fluid's yield stress must be exceeded in order to initiate flow. When the fluid is exposed to a magnetic field the flow threshold yield stress increases as the flux density in the field increases. Yield stress is also known to increase as the volume fraction of solid particles in the suspension is increased. Accordingly, a desired yield stress for a selected magnetorheological fluid operating in a clutch can be achieved by controlling the volume fraction of suspended particles. Magnetorheological fluids useful as in the present invention are described in detail by commonly assigned U.S. patent application Ser. No. 08/629,249 entitled "Magnetorheological Fluids," filed Apr. 8, 1996, and which is specifically incorporated herein by reference. For purposes of the present invention, the magnetorheological fluid contained in cavity 24 carries a selected volume percent of solid particles and permits substantially complete slippage between the input member 12 and the output member 22 when the clutch is disengaged, permits a gradually increasing torque transfer between the input member 12 and output member 22 as the clutch is engaging, and provides substantially complete coupling when the clutch is fully engaged with minimal slippage between the input and output members 12 and 22, respectively.

The engagement mechanism of the fan clutch 10 principally includes an annular permanent magnet 35, a ferromagnetic element in the form of ring 36, and the operative gap 37 that exists therebetween. The magnet 35 is carried by a wheel-shaped rotor 39 that is carried on the reduced diameter segment 21 of input member 12. The rotor 39 is affixed, in a manner such as to be axially slidably, on reduced diameter segment 21, but is keyed such as to ensure concerted rotation between the rotor 39 and the input member 12. The hub 41 of rotor 39 includes an opening 42 exhibiting a slip-fit over the reduced diameter segment 21 with a slot 43 that receives the key 44. The rotor 39 is biased forward under the force of a coil spring 44 which bears against an annular washer 45 that is grounded by being positioned against annular shoulder 20.

The bias of spring 44 is offset by spindle 46 of thermal actuator 47. The point contact between spindle 46 and central hub 41 is such as to not inhibit relative rotation therebetween. Thermal actuator 47 is securely carried in opening 48 of forward wall 25 with a fluid-tight seal provided by annular elastomeric seal 49. Thermal actuator 47 is a conventional type of device that responds to generate force by the expansion of a well-known material carried within the thermal actuator 47. Such materials include thermally expanding gases, polymers, slurries and similar materials. In operation, as the ambient temperature around thermal actuator 47 increases, the internal material expands forcing the spindle 46 rearwardly with the thermal actuator 47 fixed within the forward wall 25. The central hub 41 includes a stop 50, which upon engagement with the second end 16 of the input member 12 limits axial travel of the rotor 39 rearwardly. Upon increasing ambient temperature about the thermal actuator 47, the rotor 39 is forced to move rearwardly (to the left as viewed in the FIGURE), by the spindle 46. During a reduction in ambient temperature about thermal actuator 47, the spindle 39 is forced to move forward (to the right as viewed in the FIGURE), under the bias of spring 44.

The ferromagnetic ring 36 is carried in groove 52 of the cylindrical wall 26 of output member 22. The ferromagnetic ring 36 is substantially frusto-conical in shape and is exposed at surface 54 to the magnetorheological fluid carried within cavity 24. The surface 53 of rotor 39 includes an exposed surface of the permanent magnet 35 and is tapered rearwardly to substantially match the nearby contour of the ferromagnetic ring 36. By means of this construction the operative gap 37 is variable such that the distance between the surfaces 53 and 54 is reduced when the thermal actuator 47 causes the rotor 39 to be forced rearwardly and conversely, the distance increases as the spring 44 causes the rotor 39 to move forwardly.

The magnetic field generated by the permanent magnet 35 introduces a magnetic flux into the operative gap 37 such that the shear stress of the fluid adjacent surface 53 is substantially increased while in the disengaged position shown, and the shear stress adjacent the surface 54 is substantially unaffected. Accordingly, disengagement is effected such that the input member 12 rotates relatively freely while the output member 22 is substantially nonrotating.

The expandable material contained within the thermal actuator 47 is calibrated such that the effect caused by the vehicle's radiator (not illustrated), which is positioned in close proximity thereto, results in a preferred rate of engagement of the fan clutch 10. It is known that the temperature increase of incoming air flowing through the radiator and about the thermal actuator 47 will be in direct relation to the amount of cooling air required to be induced by the cooling fan carried by the fan clutch 10. The forward wall 25 is preferably formed of an efficient heat transfer material such as aluminum and includes a plurality of ribs 56 which engage the thermal actuator 47 to transfer the affect of temperature increases of the ambient air flowing thereabout in a responsive manner.

The fan clutch 10 becomes engaged as the spindle 46 of thermal actuator 47 pushes the rotor rearwardly such that the operative gap 37 is decreased in distance between the surfaces 53 and 54. As the magnetic flux generated by the permanent magnet 35 is increased in density within the ferromagnetic ring 36, the random domains in the unmagnetized ferromagnetic material align with the magnetic field applied by the permanent magnet 35. As a result of this polarization of the ring 36, the fluid shear stress about the surface 54 is proportionally increased for the magnetorheological fluid. Thus, as the thermal actuator 47 causes the rotor 39 to move rearwardly, the amount of torque transferred from the input member 12 to the output member 22 is proportionally increased. Accordingly, a variable fan clutch is provided, wherein the amount of torque transferred is gradually and progressively increased as needed, according to the cooling requirements of the associated vehicle's engine. Output torque is varied by effecting a varying flux field transfer between the permanent magnet 35 and the annular ferromagnetic ring 36 without the need of providing a separate electrical power supply thereto, and without the need of external control devices.

What is claimed is:

1. A passive magnetorheological clutch comprising:

an input member that is driven at a selected speed;

an output member journaled on the input member so as to be supported thereon in a substantially nonrotating state and to be concentrically rotatable substantially in concert therewith;

a cavity presented between the input and output members containing a quantity of magnetorheological fluid and an engagement mechanism including a magnetic element generating a magnetic field and a ferromagnetic element positioned near the magnetic element with an operative gap therebetween, wherein the operative gap's dimension is variable to effect changes in the magnetic field passing between the magnetic element and the ferromagnetic element; and an actuator with a spindle providing a motive force to vary the relative position between the magnetic element and the ferromagnetic element, wherein when the actuator effects a reduction in the distance between the magnetic element and the ferromagnetic element, the amount of magnetic field increases in density adjacent the ferromagnetic element and a resultant torque transfer from the input member to the output member is effected across the operative gap and through the magnetorheological fluid so that as the operative gap is reduced, the input and output members are engaged in a progressive and gradual manner.

2. A passive magnetorheological fan clutch according to claim 1 wherein the magnetic element comprises a permanent magnet having an annular structure with a tapered radially outer surface and wherein the ferromagnetic element comprises a frusto-conical shaped ring.

3. A passive magnetorheological clutch comprising:

an input member that is driven at a selected speed and includes a first end and a second end;

an output member journaled on the input member between the first and second ends by a bearing assembly so as to be supported thereon in a substantially nonrotating state and to be concentrically rotatable substantially in concert therewith;

a cavity presented between the input and output members containing a quantity of magnetorheological fluid and an engagement mechanism including a permanent magnet generating a magnetic field and carried on the input member near the second end by a rotor, and a ferromagnetic ring positioned near the permanent magnet and carried by the output member with an operative gap between the permanent magnet and the ferromagnetic ring, wherein the operative gap's dimension is variable to effect changes in the magnetic field passing between the permanent magnet and the ferromagnetic ring; and an actuator with a spindle providing a motive force to move the rotor axially to vary the relative position between the permanent magnet and the ferromagnetic ring, wherein when the actuator effects a reduction in the distance between the permanent magnet and the ferromagnetic ring, the amount of magnetic field increases in density adjacent the ferromagnetic ring and a resultant torque transfer from the input member to the output member is effected across the operative gap and through the magnetorheological fluid so that as the operative gap is reduced, the input and output members are engaged in a progressive and gradual manner.

4. A passive magnetorheological fan clutch according to claim 3 wherein the permanent magnet comprises an annular structure with a tapered radially outer surface and wherein the ferromagnetic ring comprises a frusto-conical shaped structure.

5. A passive magnetorheological clutch for variably engaging rotation of an engine cooling fan comprising:

an input member that is driven at a selected speed and includes a first end and a second end with an intermediate segment between the first and second ends and a reduced diameter segment adjacent the second end;

an output member journaled on the input member at the intermediate segment by a pair of bearing assemblies so as to be supported on the input member in a substantially nonrotating state and to be concentrically rotatable substantially in concert with the input member;

a sealed cavity presented between the input and output members containing a quantity of magnetorheological fluid and an engagement mechanism including a permanent magnet generating a magnetic field and carried on the reduced diameter segment of input member near the second end by a rotor in an axially slidable manner, and a ferromagnetic ring positioned near the permanent magnet and carried by the output member with an operative gap between the permanent magnet and the ferromagnetic ring, wherein the operative gap's dimension is variable to effect changes in the magnetic field passing between the permanent magnet and the ferromagnetic ring;

a thermal actuator with a spindle providing a motive force to move the rotor axially to vary the relative position between the permanent magnet and the ferromagnetic ring; and a spring biasing the rotor toward the thermal actuator, wherein when the thermal actuator compresses the spring effecting a reduction in the distance between the permanent magnet and the ferromagnetic ring, the amount of magnetic field increases in density adjacent the ferromagnetic ring and a resultant torque transfer from the input member to the output member is effected across the operative gap and through the magnetorheological fluid so that as the operative gap is reduced, the input and output members are engaged in a progressive and gradual manner.

6. A passive magnetorheological fan clutch according to claim 3 wherein the permanent magnet comprises an annular structure with a tapered radially outer surface and wherein the ferromagnetic ring comprises a frusto-conical shaped structure.

\* \* \* \* \*